United States Patent
Balsdon

(10) Patent No.: US 7,101,147 B2
(45) Date of Patent: Sep. 5, 2006

(54) SEALING ARRANGEMENT

(75) Inventor: Julian G. Balsdon, Bristol (GB)

(73) Assignee: Rolls-Royce PLC, London (GB)

( * ) Notice: Subject to any disclaimer, the term of this patent is extended or adjusted under 35 U.S.C. 154(b) by 85 days.

(21) Appl. No.: 10/797,001

(22) Filed: Mar. 11, 2004

(65) Prior Publication Data

US 2005/0008473 A1    Jan. 13, 2005

(30) Foreign Application Priority Data

May 16, 2003    (GB)    ................................ 0311378

(51) Int. Cl.
*F01D 11/00*    (2006.01)
(52) U.S. Cl. ................ 415/135; 415/138; 415/139; 415/191; 415/173.3; 415/174.2; 277/642; 277/643; 277/649
(58) Field of Classification Search ........ 415/135–136, 415/138–139, 191, 170.1, 173.3, 174.2, 214.1, 415/173.1, 113; 416/190–191, 193 A, 248; 277/637, 641–644, 648–649
See application file for complete search history.

(56) References Cited

U.S. PATENT DOCUMENTS

| 3,752,598 | A | * | 8/1973 | Bowers et al. .............. 415/139 |
| 3,975,114 | A | | 8/1976 | Kalkbrenner |
| 3,986,789 | A | * | 10/1976 | Pask ........................... 415/139 |
| 4,431,373 | A | * | 2/1984 | Monsarrat .................... 415/189 |
| 5,125,796 | A | * | 6/1992 | Cromer ........................ 415/174.2 |
| 5,154,577 | A | * | 10/1992 | Kellock et al. ........... 415/170.1 |
| 5,375,973 | A | * | 12/1994 | Sloop et al. ............. 415/173.1 |
| 5,407,320 | A | * | 4/1995 | Hutchinson ................. 415/116 |
| 2003/0039542 | A1 | * | 2/2003 | Cromer ....................... 415/135 |

FOREIGN PATENT DOCUMENTS

| GB | 2 221 000 A | 1/1990 |
| GB | 2 316719 A | 3/1998 |

* cited by examiner

*Primary Examiner*—Christopher Verdier
(74) *Attorney, Agent, or Firm*—Oliff & Berridge, PLC

(57) ABSTRACT

A sealing arrangement that can be employed to maintain a seal in any suitable pressure vessel including but not limited to a gas turbine engine. The sealing arrangement is forg sealing a leakage gap between at least two relatively moveable parts that are adjacent to each other in a flow path between a region of high fluid pressure and a region of low fluid pressure. The sealing arrangement comprises at least two resilient sealing strips, each strip having a portion formed along at least part of its width to locate in a groove provided along adjacent faces of the relatively moveable parts. The remaining portion of each of the sealing strips has a substantially flat surface which, in operation, abuts a corresponding flat surface of an adjacent sealing strip, thereby forming a seal.

16 Claims, 4 Drawing Sheets

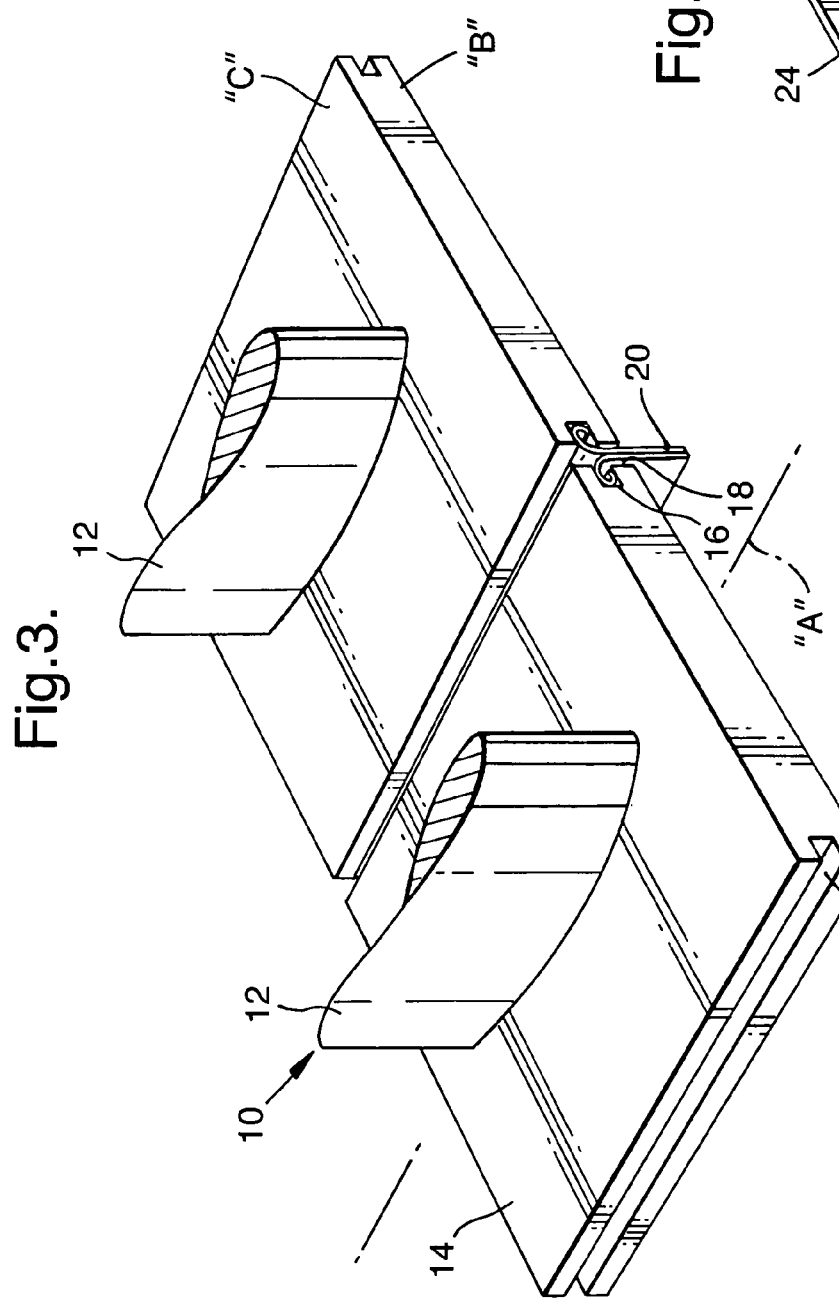
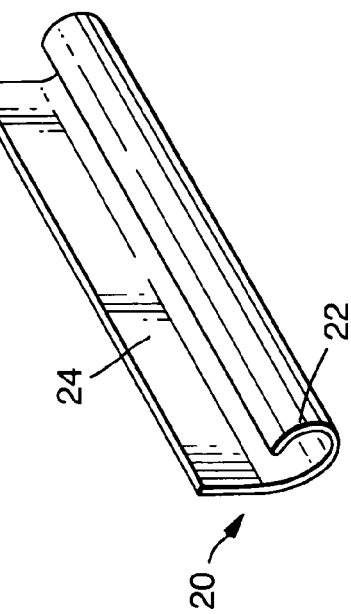

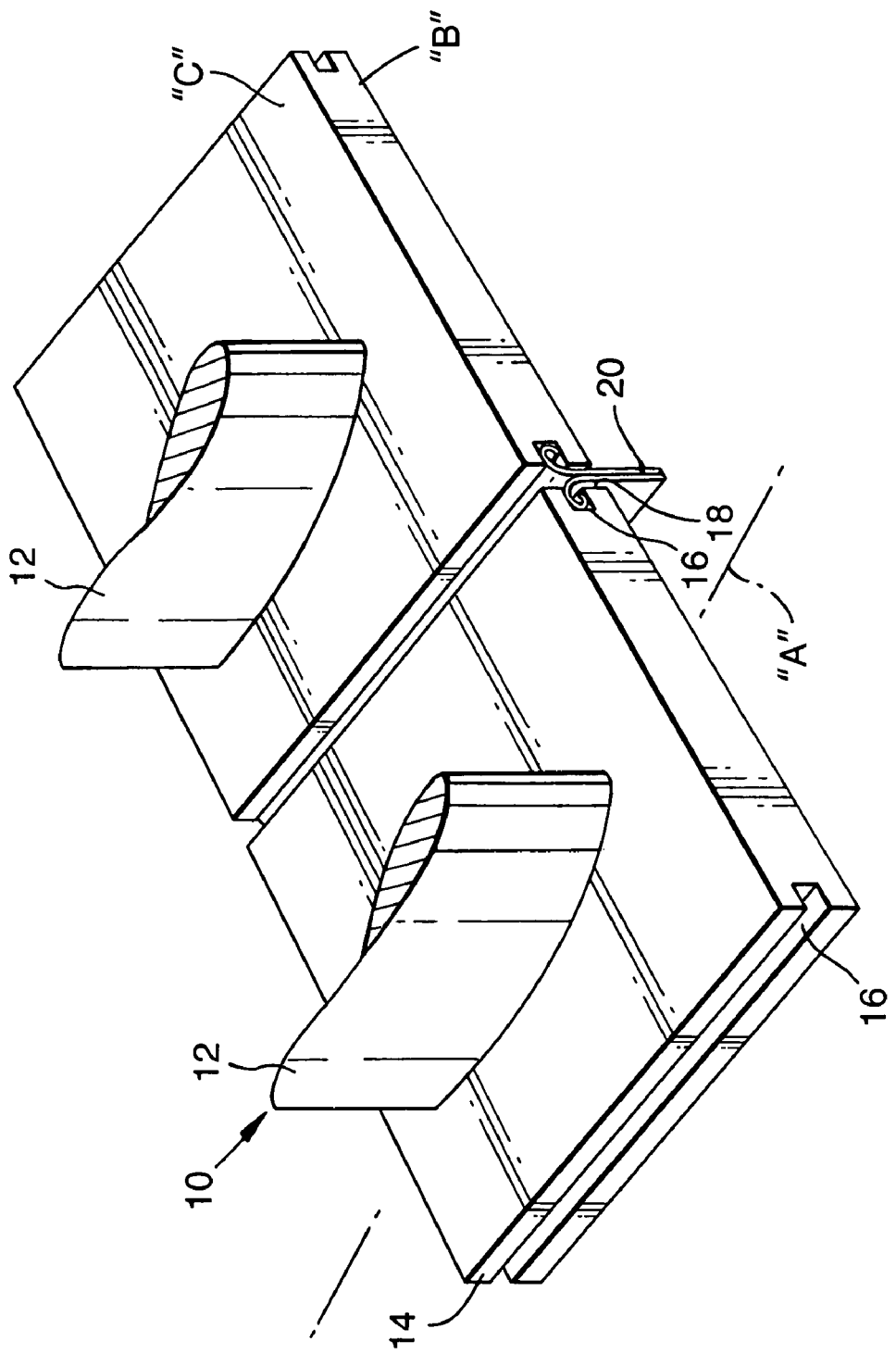

SEALING ARRANGEMENT

The invention relates to a sealing arrangement.

The sealing arrangement can be employed to maintain a seal in any suitable pressure vessel including but not limited to a gas turbine engine.

In a particular problem addressed by the invention it is required to maintain a seal between two relatively moveable parts which form part of a barrier between a region of high fluid pressure and a region of low fluid pressure. One example where such a seal is required is between platforms of a stator vane in a gas turbine engine. Conventionally adjacent faces of adjoining stator vane platforms are formed with a groove in the axial direction of the engine. A flat sealing strip is inserted into the groove thereby presenting a convoluted flow path and a reduced flow area for fluid to leak from the high pressure side to the low pressure side.

It is apparent that while the leakage is reduced, there may be a significant leakage flow, thereby reducing the overall efficiency of the engine.

Alternatively the sealing strip may be formed as a wedge and forced into the grooves such that the leakage path past the abutting faces of the adjoining platforms is substantially reduced.

This method has significant demerit as it increases the overall rigidity of the stator vane assembly. If relative movement of the stator vanes is required, by way of non limiting example, in order to alter the radial location of the stator vanes during operation of the engine, then such a configuration will limit the degree to which this can be achieved.

In accordance with the present invention there is provided a sealing arrangement for sealing a leakage gap between at least two relatively moveable parts which are adjacent to each other in a flow path between a region of high fluid pressure and a region of low fluid pressure, at least one groove being provided along each adjacent face of the relatively moveable parts, wherein the sealing arrangement further comprises at least two resilient sealing strips, each strip having a portion formed along at least part of its width to locate in the at least one groove, the remaining portion of each of the at least two sealing strips having a substantially flat surface, the at least two sealing strips being configured such that in operation their substantially flat surfaces abut each other and the pressure difference between the high pressure region and the low pressure region cause the flat surfaces to be forced together.

Preferably the at least two sealing strips are formed such that the portion shaped to locate in the at least one groove is of arcuate cross-sectional configuration. Alternatively the at least two sealing strips are formed such that the portion shaped to locate in the at least one groove is of "C" shaped cross-sectional configuration.

Preferably the at least two relatively moveable parts form part of a seal disposed around a substantially cylindrical pressure vessel. Alternatively the at least two relatively moveable parts form part of a seal disposed around a substantially frusto-conical pressure vessel.

Preferably the pressure vessel is a gas turbine engine.

The invention is a means for sealing between two relatively moveably parts including, but not limited to, platforms of stator vanes and seal liner segments in a gas turbine engine.

The invention and how it may be carried into practice will now be described in detail with reference, by way of example, to embodiments illustrated in the accompanying figures, in which:

FIG. 3 illustrates part of a stator vane assembly incorporating a sealing arrangement in accordance with the present invention;

FIG. 4 shows an enlarged view of one embodiment of a sealing strip for use in a stator vane assembly incorporating a sealing arrangement;

Figure 1:
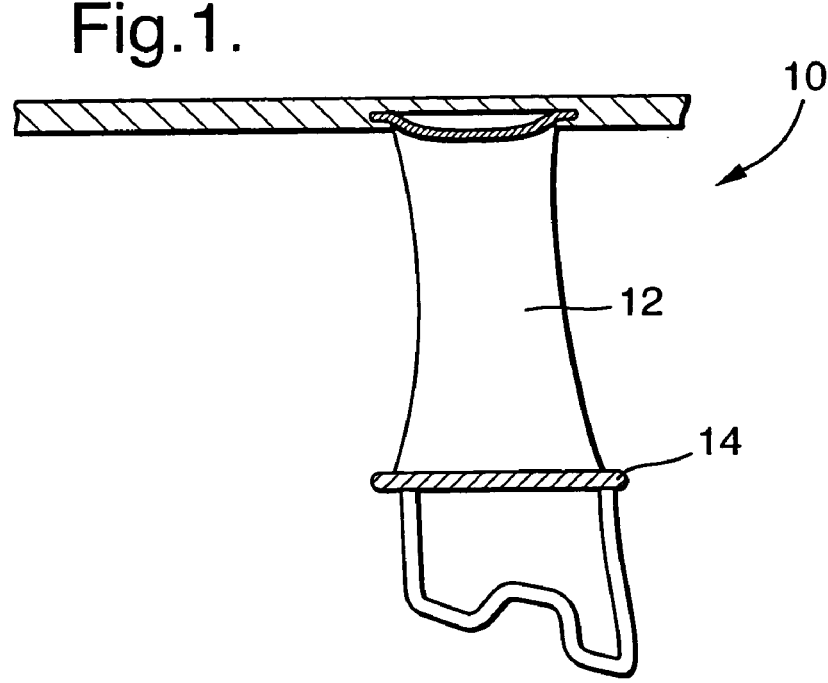
FIG. 1 shows part of a turbine vane assembly incorporating a sealing arrangement in accordance with the present invention in which a substantially cylindrical pressure vessel is formed by the sealing between the stator vanes.
Figure 2:
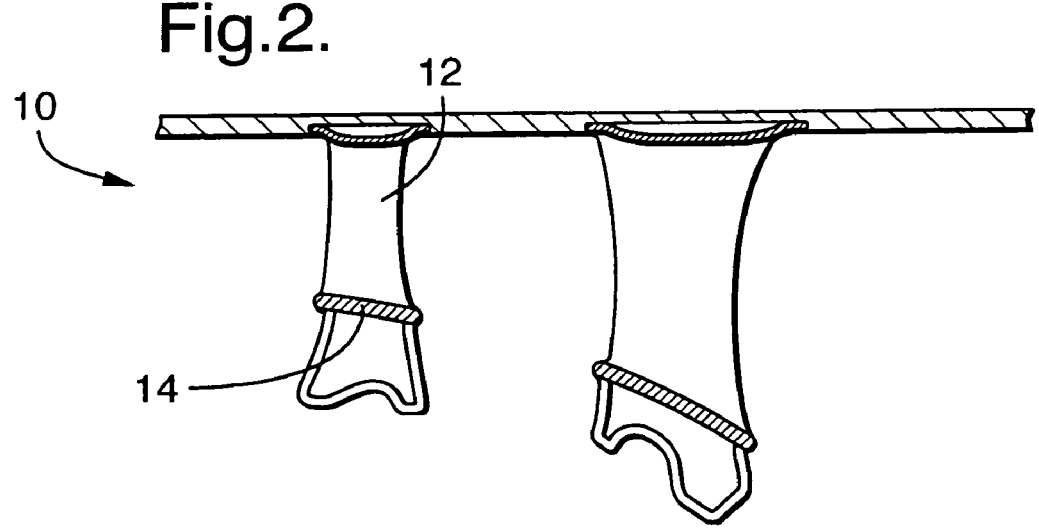
FIG. 2 shows part of a turbine vane assembly incorporating a sealing arrangement in accordance with the presentation in which a substantially frusto-conical pressure vessel is formed by the sealing between the stator vanes.

The vane assembly 10 presented in FIG. 1, FIG. 2 and FIG. 3 forms part of a conventional gas turbine engine well known in the art and will not be described in this specification beyond that necessary to gain an understanding of the invention. FIG. 1 shows a region of a turbine assembly where a substantially cylindrical pressure vessel is formed by the sealing between stator vanes 12. FIG. 2 shows a region of a turbine assembly where a substantially frusto-conical pressure vessel is formed by the sealing between stator vanes 12.

The vane assembly 10 comprises an annular array of stator vanes 12, each of which is formed with a platform 14 which is located on the engine by any suitable means. A groove 16 is formed into the face 18 of each platform 14 which is adjacent to a circumferentially adjoining platform 14. Each of the grooves 16 is aligned substantially in the axial direction of the engine shown at "A". A sealing strip 20 is located in each of the grooves 16 and is substantially of the same length as the platform 14. The sealing strips 20 are formed such that at least part of their width is shaped to locate in the groove 16, the remaining portion of the sealing strip 20 being substantially flat.

In operation a surface indicated at "B" on the platform 14 will be exposed to a higher fluid pressure than a surface indicated at "C" on the platform 14.

A sealing strip 20 is presented in FIG. 4. It comprises a resilient member formed along at least part of its width such that the portion shaped to locate in the groove 16 is arcuate or "C" shaped, hereafter referred to as the formed portion 22. The remaining portion of the sealing strip is substantially flat, hereafter referred to as the flat portion 24.

Figure 5:
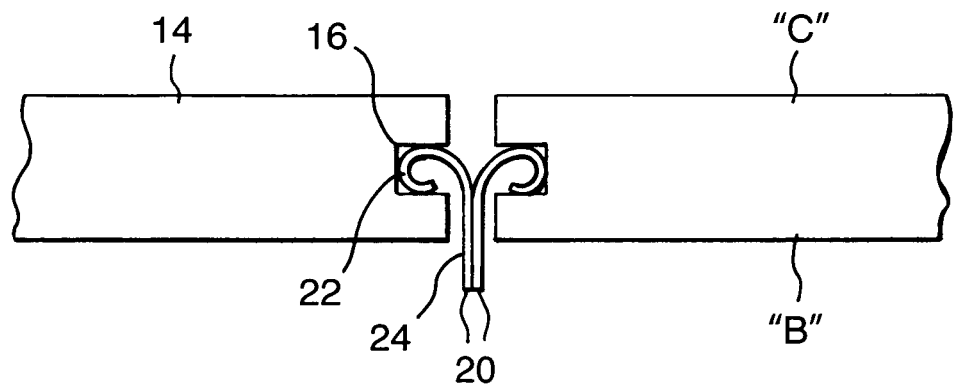
FIG. 5 shows an enlarged cross sectional view of part of the stator vane assembly shown in FIG. 3.

An enlarged view of a cross section showing detail of the formed portion 22 of the sealing strips 20 located in the platform grooves 16 is presented in FIG. 5. The flat portions 24 of the sealing strips 20 are in communication with each other substantially along their length, although it will be appreciated that the formed portion 22 may be a loose fit in the groove 16 and that adjacent flat portions 24 may be spaced apart when the engine is not in operation.

In operation the flow of fluid between the high pressure surface side "B" and the low pressure surface side "C" the sealing strips 20 and the platforms 14 will force the flat portions 24 of the adjacent sealing strips 20 together, forming a seal. High pressure fluid entering the volume partially enclosed by the formed portion 22 will cause the formed portion 22 to expand into the groove 16, thereby forming a seal.

It will be appreciated that the greater the difference between the high pressure fluid acting on surface "B" and the low pressure fluid acting on surface "C" then the greater the force pressing the flat portions 24 together and deforming the formed portions 22, and hence providing a better seal.

Figure 6:
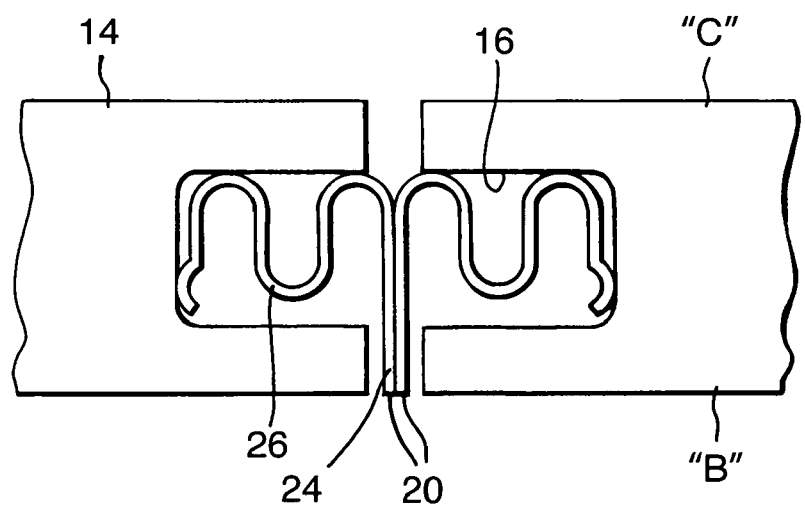
FIG. 6 shows a cross sectional view of part of a stator vane platform comprising an alternative embodiment of the sealing arrangement in accordance with the present invention.

It will be appreciated that the formed portion 22 may be any shape which fulfils the same function, such as an "E" or "W" shaped cross-sectional configuration. Such a "W" or "E" shaped portion 26 is shown in FIG. 6.

It will be appreciated that the sealing strips 20 will also provide an adequate seal if they are aligned substantially at an angle to the axial direction of the pressure vessel, as shown in FIG. 7.

It will also be appreciated that the invention may be employed in any suitable application, including but not limited to, the compressor and turbine sections of a gas turbine engine and seal liner segments of a gas turbine engine.

It will be appreciated that FIGS. 3 and 4 may, in addition to that described above, represent an enlarged view of a seal interface between adjacent seal liner segments.

The configurations shown in the accompanying figures are diagrammatic. The design of the vanes, the vane platforms, the grooves and the sealing strips may vary between designs. Likewise the configuration and relative positioning of the described components may differ in different embodiments of the invention.

What is claimed is:

1. A sealing arrangement for sealing a leakage gap between at least two relatively moveable parts which are adjacent to each other in a flow path between a region of high fluid pressure and a region of low fluid pressure, at least one groove being provided along each adjacent face of the relatively moveable parts, wherein the sealing arrangement further comprises at least two resilient sealing strips, each strip having a portion formed along at least part of its width to locate in the at least one groove, the remaining portion of each of the at least two sealing strips consisting of a substantially flat surface, the at least two sealing strips being configured such that in operation their substantially flat surfaces abut each other and the pressure difference between the high pressure region and the low pressure region cause the flat surfaces to be forced together, the substantially flat surfaces extending out of the at least one groove.

2. A sealing arrangement as claimed in claim 1 wherein the at least two sealing strips are formed such that the portion shaped to locate in the at least one groove is of arcuate cross-sectional configuration.

3. A sealing arrangement as claimed in claim 1 wherein the at least two sealing strips are formed such that the portion shaped to locate in the at least one groove is of "C" shaped cross-sectional configuration.

4. A sealing arrangement as claimed in claim 1 wherein the at least two sealing strips are formed such that the portion shaped to locate in the at least one groove is of "E" shaped cross-sectional configuration.

5. A sealing arrangement as claimed in claim 1 wherein the at least two sealing strips are formed such that the portion shaped to locate in the at least one groove is of "W" shaped cross-sectional configuration.

6. A sealing arrangement as claimed in claim 1 wherein the at least two relatively moveable parts form part of a seal disposed around a substantially cylindrical pressure vessel.

7. A sealing arrangement as claimed in claim 1 wherein the at least two relatively moveable parts form part of a seal disposed around a substantially frusto-conical pressure vessel.

8. A sealing arrangement as claimed in claim 6 wherein the at least two sealing strips are aligned substantially in the axial direction of the pressure vessel.

9. A sealing arrangement as claimed in claim 7 wherein the at least two sealing strips are aligned substantially in the axial direction of the pressure vessel.

10. A sealing arrangement as claimed in claim 6 wherein the at least two sealing strips are aligned substantially at an angle to the axial direction of the pressure vessel.

11. A sealing arrangement as claimed in claim 7 wherein the at least two sealing strips are aligned substantially at an angle to the axial direction of the pressure vessel.

12. A sealing arrangement as claimed in claim 1 wherein the at least two relatively moveable parts are platforms of stator vanes.

13. A sealing arrangement as claimed in claim 1 wherein the at least two relatively moveable parts are seal liner elements.

14. A sealing arrangement as claimed in claim 1 wherein said sealing arrangement forms part of a gas turbine engine.

15. A sealing arrangement as claimed in claim 6 wherein the pressure vessel is a gas turbine engine.

16. A sealing arrangement as claimed in claim 7 wherein the pressure vessel is a gas turbine engine.

* * * * *